United States Patent [19]
Johnson et al.

[11] 3,883,146
[45] May 13, 1975

[54] HAND-HELD PLAYBACK DEVICE, SYSTEM AND METHOD

[75] Inventors: Reynold B. Johnson, Palo Alto; Ronald D. Irvin, Los Gatos, both of Calif.

[73] Assignee: Education Engineering Associates, Palo Alto, Calif.

[22] Filed: Apr. 4, 1973

[21] Appl. No.: 347,841

[52] U.S. Cl. ............ 274/9 C; 179/100.1 C; 35/8 A; 35/35 A
[51] Int. Cl. .......................................... G11b 25/04
[58] Field of Search...... 274/9 C, 1 A; 179/100.1 C, 179/100.2 HT; 35/8 A, 35 A, 35 C, 38; 360/101, 117

[56] References Cited
UNITED STATES PATENTS

| | | | |
|---|---|---|---|
| 2,486,662 | 11/1949 | Leitner | 274/9 R |
| 3,224,782 | 12/1965 | Isemura | 274/9 C |
| 3,472,970 | 10/1969 | Basseches | 35/35 C X |
| 3,633,924 | 1/1972 | Cowell et al. | 274/9 C |
| 3,702,032 | 11/1972 | Doring | 35/8 A |

*Primary Examiner*—Richard E. Aegerter
*Assistant Examiner*—Charles E. Phillips
*Attorney, Agent, or Firm*—Flehr, Hohbach, Test, Albritton & Herbert

[57] ABSTRACT

A hand-held playback device primarily useful for audio teaching of correct pronunciation of words for transducing mini-records from the pages of books and other sheet material upon which is shown or otherwise displayed some of the same information as is recorded on the record. To effect playback, the device is necessarily aligned in a manner whereby the human observable material is designated, for example, to the eye of the student, while at the same time it is being played back to him. Braille characters can be observed by the student at the same time as they are broadcast on a loudspeaker to the student so as to reinforce the learning process in one embodiment.

9 Claims, 19 Drawing Figures

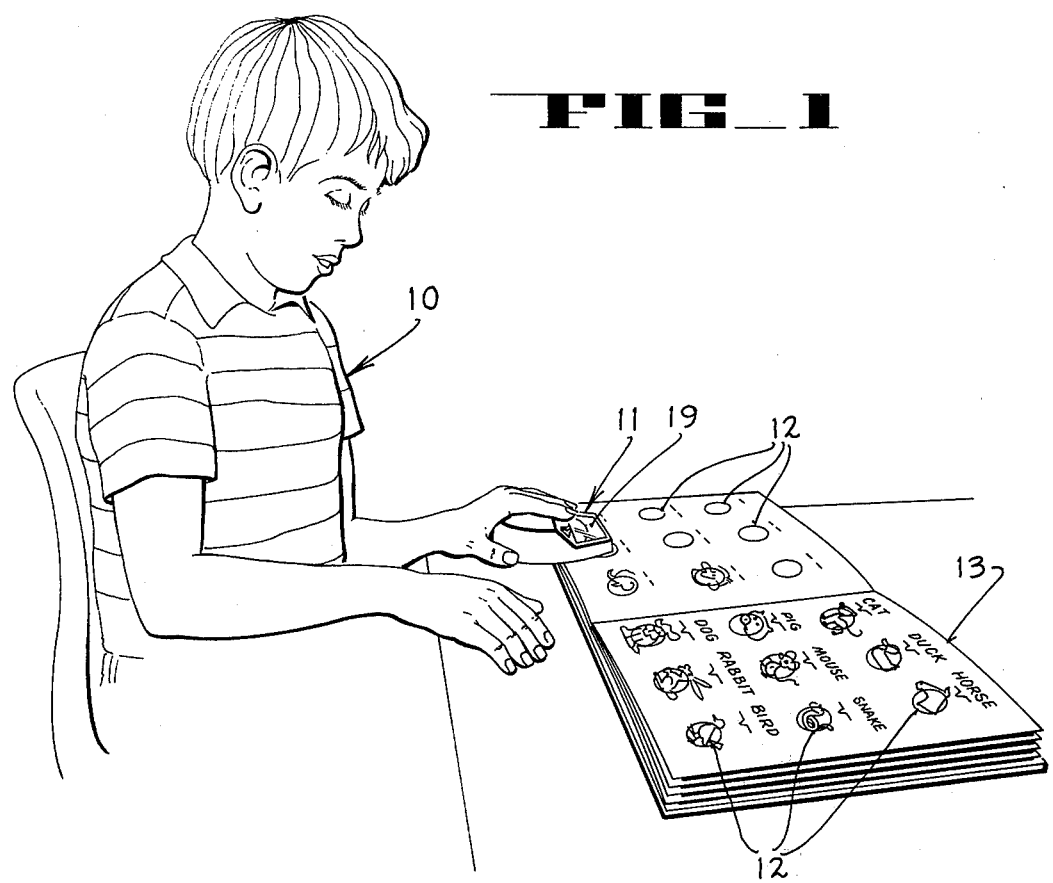
FIG_1
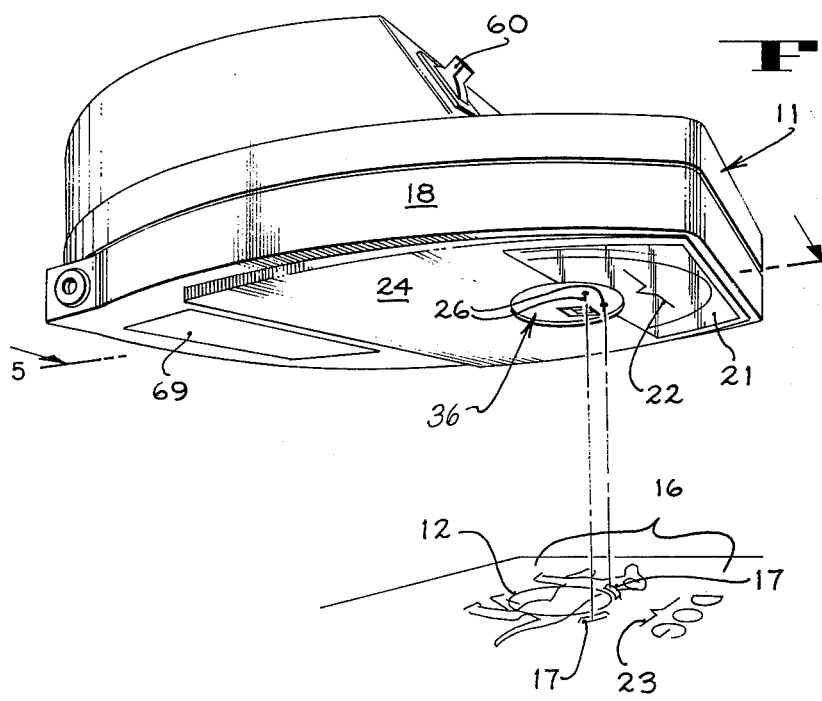
FIG_2

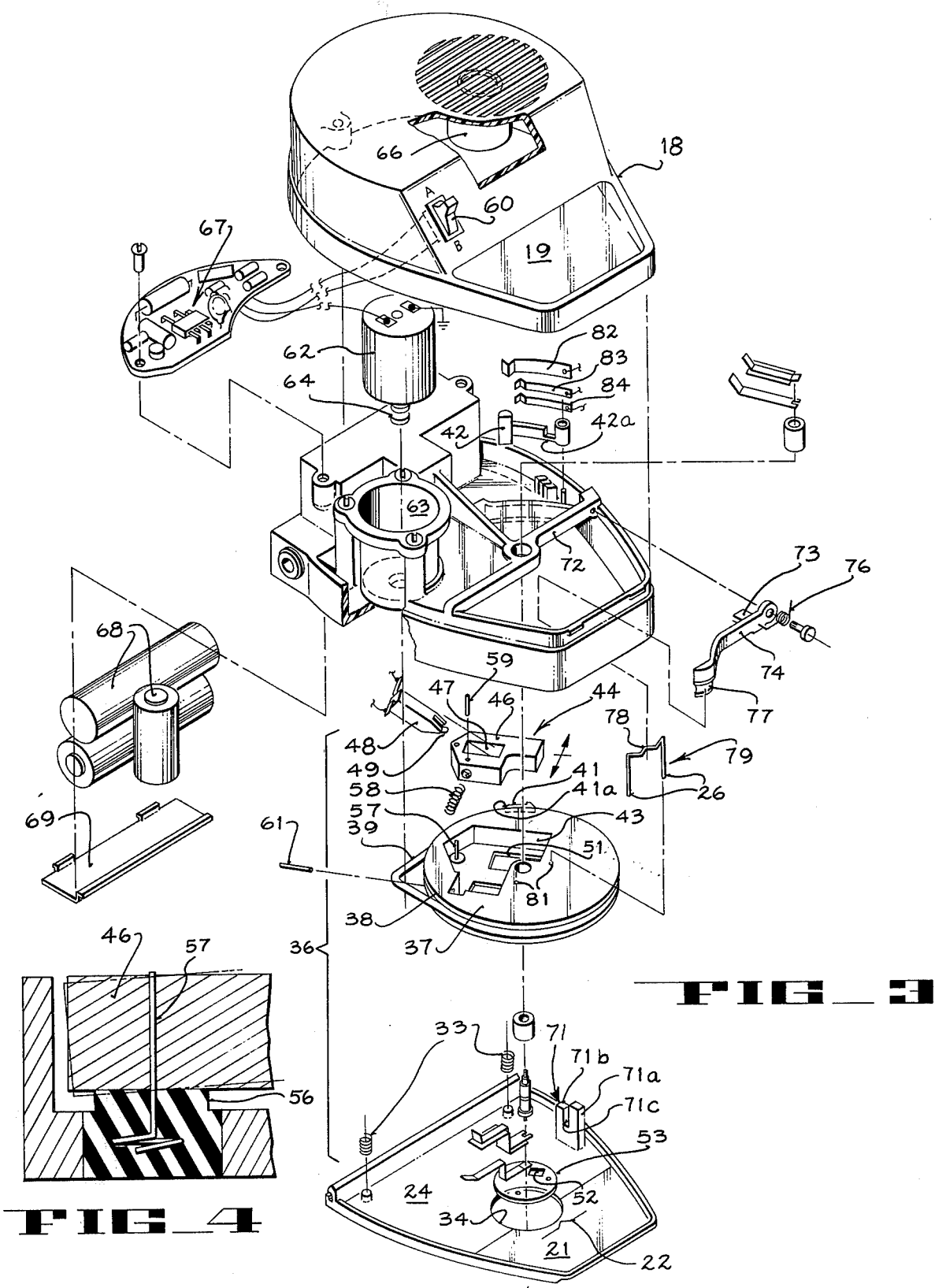

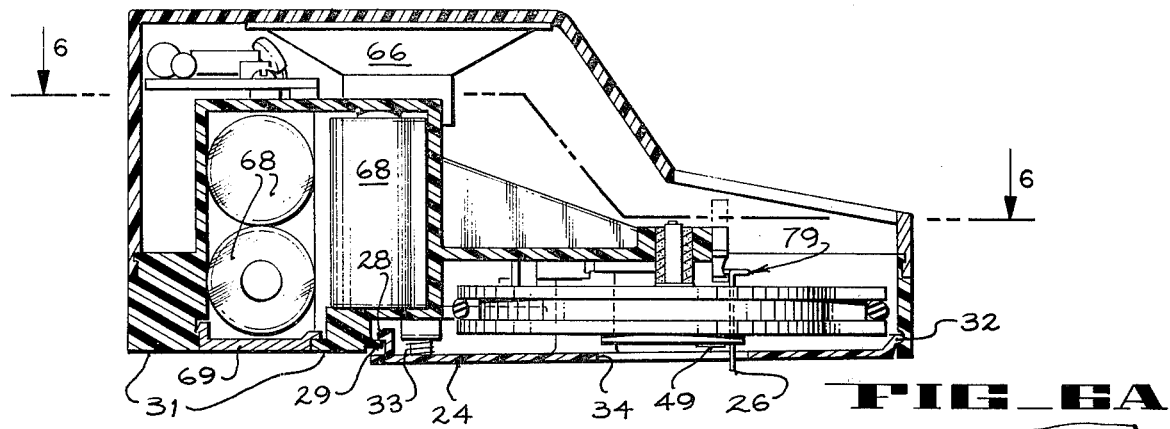
FIG_5
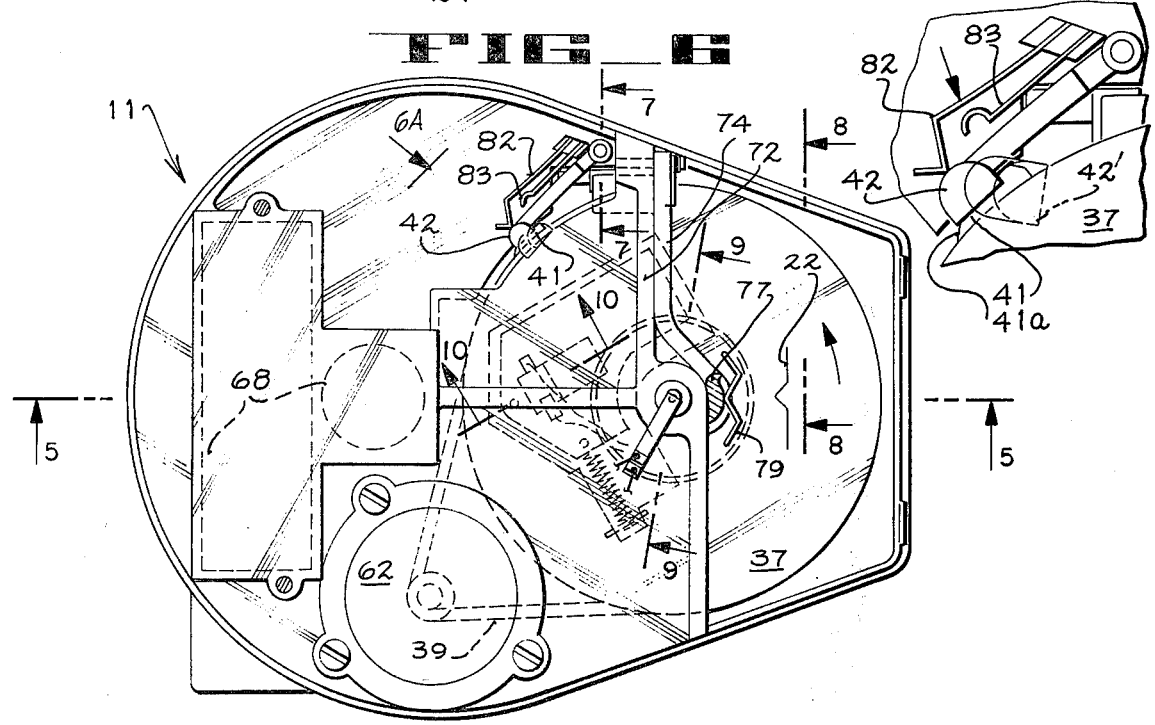
FIG_6
FIG_6A
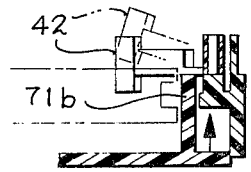
FIG_7
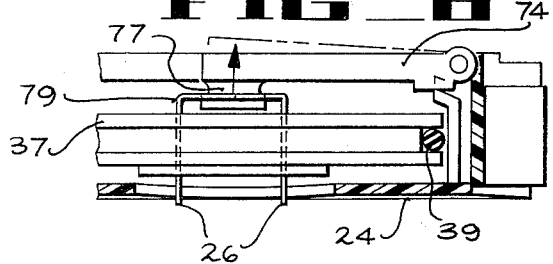
FIG_8

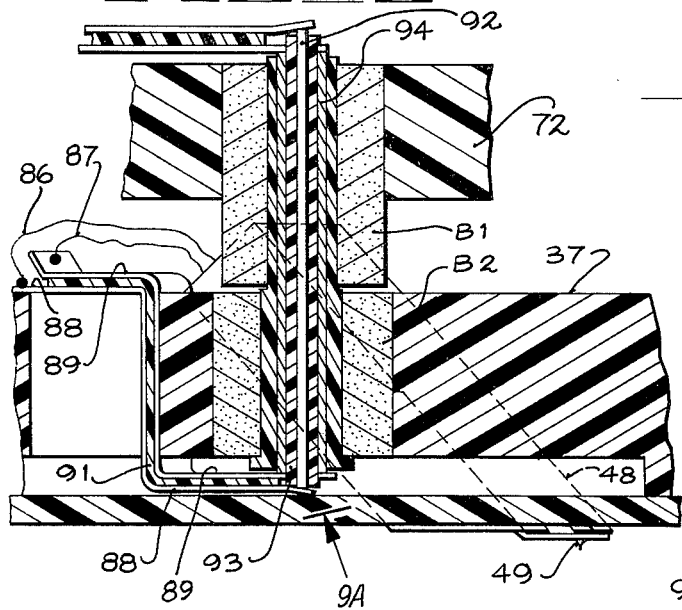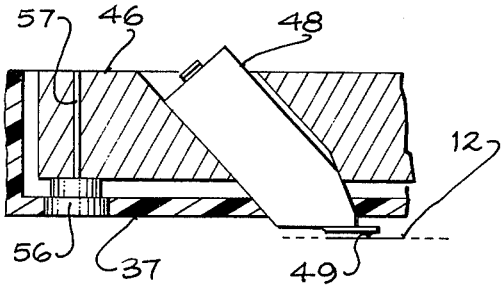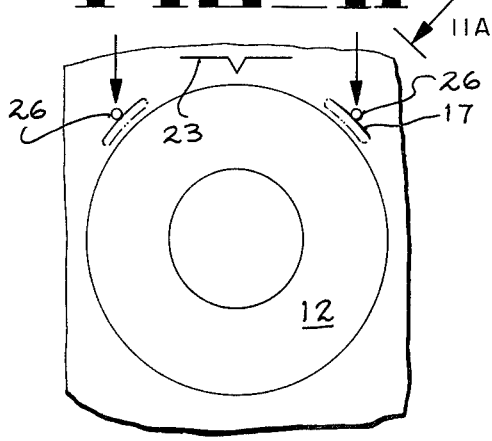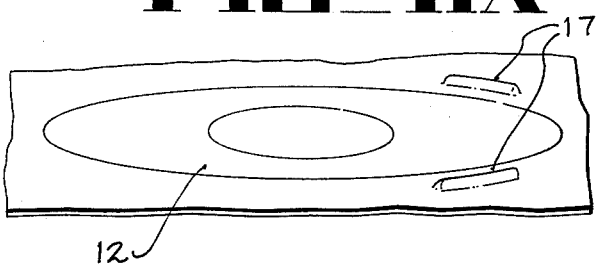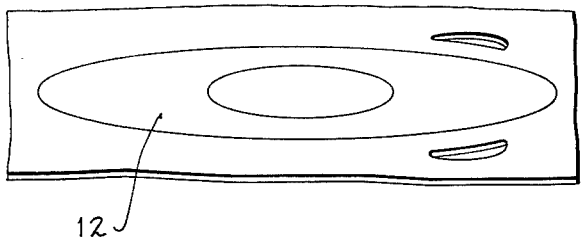

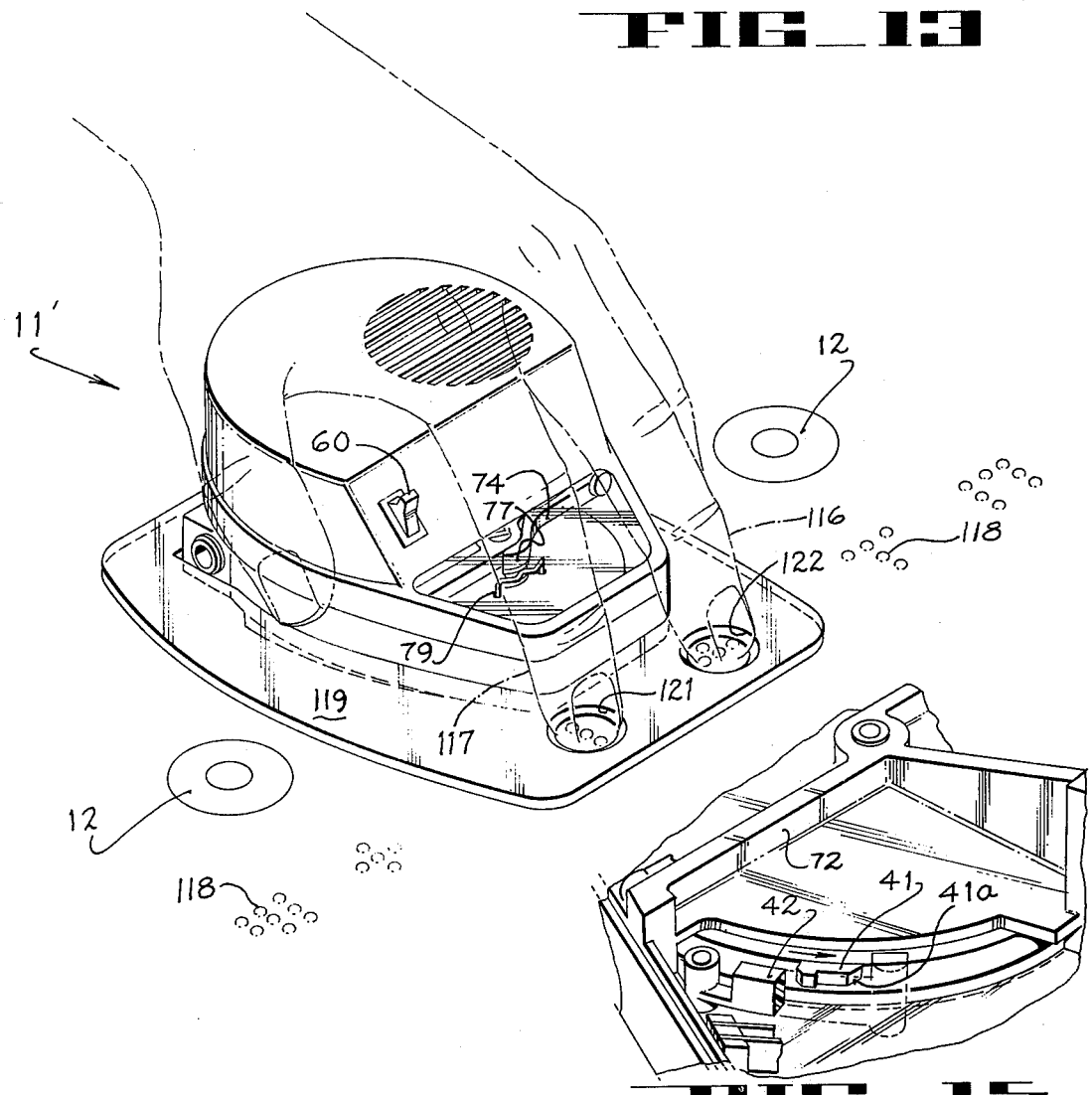
FIG_13
FIG_15
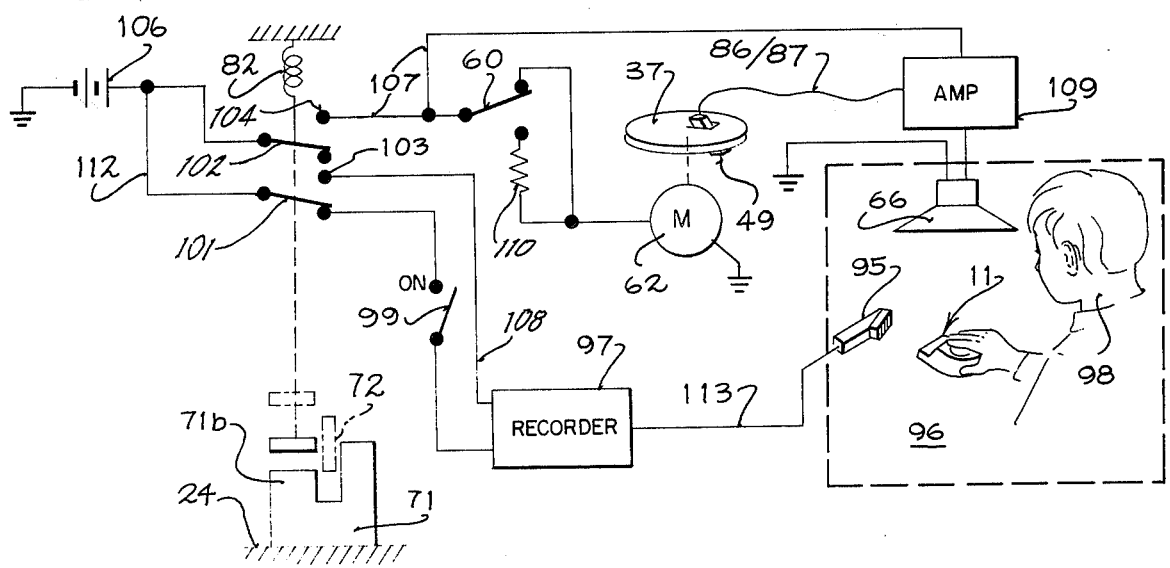
FIG_14

3,883,146

HAND-HELD PLAYBACK DEVICE, SYSTEM AND METHOD

BACKGROUND OF THE INVENTION

This invention pertains to a hand-held transducing device, system and method for transducing signals previously recorded on very small records. The invention is praticularly useful in the teaching of correct pronunciation of words by providing a ready comparison between the student's pronunciation of a given word and then listening to the correctly recorded pronunciation of the word. The invention is also particularly useful in reinforcing the learning process by essentially designating, framing or otherwise calling specific attention to the written form of a word while hearing the word as it is played back.

Thus, in order to operate the device, the student is substantially required to essentially "point" to the word which he is to hear from the record as the record is played back.

Heretofore, flexible records have been carried on the pages of books or on other sheet material and, in one instance, the information to be played back is recorded on one side of the sheet while the other side of the sheet carries a picture or display of information for the student to observe.

In the present instance, it is considered that there is substantial worth and advantage in causing the student to essentially point to the material which is being taught at the same time as the student hears the pre-recorded material from his hand-held device.

The present device also can be employed in transducing any record applied to a sheet such as, for example, in the handling of data and other information in stores and the like.

In the past there has also been a tendency to employ relatively large diameter records due to difficulty in being able to properly register the transducer of the playback device with the record. Accordingly, it is believed that a substantial additional amount of information can be recorded upon a sheet wherein the records are quite small but this, of course, raises the problem of being able to obtain proper registration with these very small records. As disclosed herein, however, there is provided an efficient means for quickly and easily registering the transducer of the playback device with each of the small records recorded upon the sheets of a book, for example.

SUMMARY OF THE INVENTION AND OBJECTS

In general, there is provided a hand-held transducing device for transducing information signals relative to a stationary record carried on a sheet of material. The device includes a housing small enough to be held in one hand. A playback assembly disposed within the housing includes a rotatable body, a transducer carried by the body during rotation of the body for following the path of the record and means for driving the body. The housing is formed to include an opening serving to define therethrough an observable indicia area on a portion of the sheet adjacent the record and adapted to include at least a portion of the information to be reproduced from the record. Means are carried by the rotatable body for registering the transducer to follow the record path. Finally, means are provided for contemporaneously designating the same portion of the information located in the opening so as to be observed by the operator during playback of the information and also for playing back the information of the record path. In one embodiment the information to be observed is in the form of Braille characters disposed beneath finger openings located in a flange applied to the housing.

In general, it is an object of the present invention to provide an improved hand-held transducing device capable of being readily registered with very small records on the order of ¾ inch diameter while at the same time isolating for observation by the operator or student a portion of the information to be transduced from the record.

It is another object of the present invention to provide an improved teaching method as well as a system whereby a student can hear his own pronunciation in direct comparison to proper pronunciation of particular words.

The foregoing and other objects of the invention will be readily evident from the following detailed description of a preferred embodiment.

BRIEF DESCRIPTION OF THE DRAWINGS

FIG. 1 shows in perspective view a student utilizing the hand-held transducing device in a learning situation wherein the records have been recorded on the pages of a book.

FIG. 2 shows a perspective view of a hand-held transducing device of a type shown in use in FIG. 1.

FIG. 3 shows a perspective exploded view of a transducing device according to the invention.

FIG. 4 shows a side elevation section view in enlarged detail of a mounting post for carrying the tone arm.

FIG. 5 shows a side elevation section view taken along the line 5—5 of FIG. 6.

FIG. 6 shows a plan view in section taken along the line 6—6 of FIG. 5.

FIG. 6A shows an enlarged detail schematic view of a portion of FIG. 6.

FIGS. 7 and 8 both show enlarged detailed section views taken along the lines 7—7 and 8—8 respectively of FIG. 6.

FIG. 9 shows a side elevation section view in enlarged detail taken along the line 9—9 of FIG. 6.

FIG. 9A shows an enlarged detail perspective view from underneath FIG. 9 in the region designated 9A therein.

FIG. 10 shows an enlarged elevation detailed section along the line 10—10 of FIG. 6.

FIG. 11 shows a plan view of a diagram for use in explanation of applicants' means for registering the transducer with a record on the page of the book shown in FIG. 1.

FIG. 11A shows an enlarged perspective view of a recorded record together with part of the means utilized for registering applicants' transducer with the recorded record.

FIGS. 12 and 12A show another embodiment of the means disclosed in FIGS. 11 and 11A.

FIG. 13 shows another embodiment of applicants' hand-held device for use by persons with impaired vision and relying upon Braille characters.

FIG. 14 shows a circuit diagram of a system according to the invention.

FIG. 15 shows an enlarged perspective detailed view serving to show the relationship of a catch located on a flange of the rotatable body and a dog for cooperating with the catch to arrest the body at a predetermined location.

DESCRIPTION OF PREFERRED EMBODIMENTS

A student 10 is shown in FIG. 1 utilizing the handheld unit 11 for transducing signals from records 12 applied to the pages 13 of a book or applied to other sheets of material.

Records 12 are of a known type similar to Victrola records in the sense that they employ a spiral groove adapted to receive a transducer stylus therein for transducing signals therefrom. Records 12 are applied by conventional means to the pages of the book or to other sheets of material. An indicia area 16 (FIG. 2) is associated adjacent each record for containing information observable by the human senses, which information is also contained in recorded form in the recordation applied to record 12 associated therewith. In the present instance, as in FIG. 2, the inidica area includes the word "dog" underlined by a scribe mark for use as will be described below and also includes the picture of a dog printed on the page and located beneath the transparent record 12.

Thus, an indicia area is disposed proximate to the record and adapted to contain the information in observable form which is to be reproduced from the transducing operation.

In addition, arcuate registration portions 17 (FIGS. 2 and 11) are carried by the page proximate to record 12 and at positions displaced equally in opposite directions laterally from a midline on the page substantially extending to the center and forming a diameter of the record. In this way, as will be explained more fully below, the transducer assembly can be readily located with respect to the spiral track disposed on each of the records 12.

Unit 11 includes a housing 18 which is small enough to be held in one hand of the student. Housing 18 includes aligned windows 19, 21 with window 21 being provided with a V-shaped scribe mark 22 which, when aligned with a corresponding V-shaped scribe mark 23 printed upon the surface of the pages 13, serves generally to align unit 11 with one of the records 12 while at the same time making the name of the object, in the present instance, visible through the aligned windows 19, 21. In short, by aligning scribe marks 22, 23, the student will be able to readily observe in the indicia area 16 information which will be transduced by unit 11.

Window 21 forms a portion of a movable bottom plate 24 pivotally supported at its right-hand end as shown in FIG. 2 whereby the left-hand edge moves between lowered and raised positions for first retracting a pair of registration guide tips 26 serving to cooperate with registration portions 17 as will be described more fully below and also to initiate rotation of and playback from transducer assembly 36.

Thus, as shown in FIG. 5, bottom plate 24 includes a catch element 28 for engaging a lip 29. There is sufficient clearance above catch element 28 to permit upward movement of bottom plate 24 whereby the plane of plate 24 may become coplanar with the plane 31 of the rear of housing 18. Plate 24 pivots form its forward edge by engagement of the rib 32 with a corresponding notch formed internally of the front end of housing 18. The rear end of plate 24 is spring biased downwardly by means of a pair of springs 33 located at each of the two rear corners of plate 24. Finally, a central opening 34 formed in bottom plate 24 serves to accommodate the rotation therein of transducer assembly 36.

Transducer assembly 36 generally includes a rotating body 37 of transparent material and formed with a peripheral groove 38 adapted to receive a cyclic drive belt 39 for rotating body 37. The outer rim of body 37 carries a detent 41 fixed thereto and formed with a tapered leading edge 41a for engaging a catch 42 and serving to dispose the most unobstructed transparent portion of body 37 in line with windows 19, 21 so as to be able to view that portion of indicia area 16 containing a word recorded upon the record 12. Operation and function of catch 42 with detent 41 appears further below.

Transducer assembly 36 further includes a hollowed out portion 43 of body 37 for disposing a tone arm assembly 44. Assembly 44 includes a support body 46 formed to include an angular opening 47 for receiving a piezoelectric transducer cartridge 48. Cartridge 48 is characterized by a piezoelectric stylus element 49 whereby the mechanical vibrations imparted to element 49 are converted into electrical signals by means of a crystal (not shown) within cartridge 48. After cartridge 48 has been inserted into opening 47, stylus 49 will protrude downwardly through the bottom opening 51 as well as a smaller bottom opening 52 formed through a relatively small diameter wafer 53 secured beneath body 37. Tone arm 46 is pivotally supported (FIG. 4) upon a pedestal 56 of resilient material containing an upright pivot pin 57 so as to permit stylus 49 to pivot along an arc substantially radially outwardly from the axis of rotation of body 37. Spring means such as the coil spring 58 is anchored to tone arm 46 by means of pin 59 and anchored to body 37 by means of pin 61 whereby upon commencement of the playing of a record, stylus 49 will be located on an inner radius of the record and upon rotation of body 37, stylus 49 will proceed in a spiral path outwardly from the center of rotation until playing of the record is completed. At that time, as explained further below, release of downward pressure applied to housing 18 will serve to permit spring 58 to draw tone arm 56 back toward the center of rotation of body 37. Accordingly, the records are played from the center outwardly rather than in the usual manner of playing a Victrola record.

Finally, a drive motor 62 disposed within a cylindrical housing 63 includes a drive pulley 64 coupled to drive belt 39 for rotating the cylindrical body 37 and the transducer components disposed within the hollowed out portion 43.

A speaker 66 disposed to direct sound upwardly out of housing 18 is operated by means of suitable electronics represented by the control panel 67. The rear portion of housing 18 includes accommodations for receiving three small batteries 68 oriented in the manner shown in FIG. 3 and retained therein by means of a suitable simple closure 69.

Means for tripping and driving motor 62 so as to rotate the body 37 in response to downward pressure applied to housing 18 includes an upwardly extending bifurcated actuator 71 having portions 71a, 71b separated by a gap 71c. When assembled, gap 71c receives a transversely extending strut 72 of housing 18 and portion 71a engages the underside of a laterally extending lifting tab 73 formed as a portion of a registration retraction arm 74 which is normally spring urged downwardly by means of the spring 76 so as to bias the tips 26 downwardly. Accordingly, the end of the arm 74 includes an arcuate grooved outer portion 77 in which the tip 78 of a so-called "M" spring 79 is carried. As shown in FIG. 3, the lefthand side of tip 78 rides in the arcuate groove of portion 77. The lower ends of M spring 79 form the guide tips 26 noted above.

Referring to FIGS. 3 and 5, and M-shaped spring 79 includes a bend or tip 78 which, as shown in FIG. 3, rides in the arcuate groove of portion 77. Thus, the lefthand side of tip 78 is disposed in the righthand side of the arcuate groove 77. Arm 74 is normally urged downwardly by spring 76, but can be lifted upwardly be engagement of tab 73 with portion 71b carried to extend upwardly from the bottom plate 24 of the playback device. Referring to FIG. 5, it is evident that the bottom 24 is pivoted at 32 to move upwardly against the downward action of springs 33 located at its rear corners whereby wafer 53 forms a closure element for opening 34.

Ordinarily it might be expected that arm 74 should have some means for holding up the M-spring 79 for 360° rotation in view of the fact that the downwardly extending tips 26 are carried in the rotating body 37. A 360° element is not needed. Upon pressing the device downwardly against the record sheet or support surface upon which a record is located, the hinged bottom plate 24 moves upwardly and as it does, arm 74 is lifted by engagement between the upward projection 71b and the laterally extending piece 73 carried by arm 74. The tip 78 of M-spring 79 being located within the arcuate part 77 of arm 74, obviously serves to lift the lower tips 26 upwardly above the bottom surface of wafer 53.

In this manner, the lower lips will not scrape the surface of the page as the device rotates. As soon as M-spring 79, however, has been carried by rotation of body 37 out of engagement with groove 77, it might be expected that M-spring 79 would again fall to the surface, but this is not true. The means for retaining spring 79 in its upward position is merely the fact that the legs of spring 79 apart and are retained by friction in their elevated position within the rotating body 37. In view of the fact that the bottom 24 remains pressed against the surface so as to retain 77 in its lifted condition against the action of spring 76, the arcuate portion 77 will remain in the plane of tip 78. Continuous rotation of body 37 while so pressed to the surface carries tip 78 of spring 79 around and again into engagement with the arcuate portion 77 where, by means of the detent arrangement 41,42, body 37 is arrested with tip 78 located in the arcuate portion 77 whereupon release of the pressure applied to the top of the hand-held unit will permit spring 76 to push arm 74 downwardly, carrying with it the lower tips 26 of spring 79.

Finally, tips 26 must not be withdrawn completely from holes 81, but, as noted above, should be lifted at least to a position above the bottom surface of wafer 53 so as to readily clear the support surface upon which the device is employed.

Accordingly, by pressing downwardly on housing 18, portion 71a of actuator 71 lifts tab 73 and by virtue of the difference in mechanical advantage the grooved end 77 of arm 74 will serve to lift guide tips 26 upwardly well clear of the surface beneath wafer 53. Wafer 53 froms a rotating closure member for opening 34 in bottom 24. As noted, tips 26 extend downwardly through the holes 81 for registering stylus 49 with record 12.

Grooved portion 77 extends less than 360°. The legs of M spring 79 are biased to spring laterally apart. Accordingly, during one part of the cycle of rotation of body 37, M spring 79 is held above record 12 by grooved portion 77 being forced upwardly against bias of spring 76. During the remainder of the cycle, M spring 79 is retained above record 12 by frictional engagement with the walls of holes 81.

The other portion of actuator 71, namely portion 71b, serves to engage the underside of the elongate arm supporting catch 42 whereby the thin leaf-like portion 42a permits movement of catch 42 upwardly out of engagement with detent 41 and, as best shown in FIG. 6A, further serves to release a conductive resilient spring 82 bearing against catch 42 (and usually held by catch 42 out of engagement with contacts 83, 84) so as to make electrical contact with both the terminals 83, 84 (FIG. 3) so as to initiate operation of motor 62 for driving the transducer assembly.

Thus, during rotation of body 37, it will be evident that the guide tips or registration tips 26 will remain lifted free of the record surface beneath.

From the foregoing, it will be readily evident that so long as pressure continues to be applied to housing 18, catch 42 will remain removed from a position which would otherwise engage detent 41. However, upon release of such pressure, catch 42 will engage detent 41 thereby arresting body 37 in a position providing a clear view downwardly through windows 19, 21 (and an unobstructed portion of body 37 therebetween) so as to substantially define (and permit observation of) an indicia space beneath the device.

Finally, means are provided for converting the mechanical vibrations of stylus 49 into piezoelectric signals and then to amplify these signals in portions of control panel 67. Note, for example, in FIG. 9 the piezoelectric cartridge 48 provides an output on the two flexible leads 86, 87 to rotating contacts 88, 89 which rotate with body 37.

It will be recalled that tone arm assembly 44 carrying piezoelectric cartridge 48 pivots within opening 43 formed within body 37. Therefore, in order to mechanically isolate unit 48 from body 37 so as to prevent the mechanical induction of spurious signals, the flexible connection shown at the bottom of FIG. 9 has been provided (and as more particularly shown in FIG. 9A). However, it is appreciated that in some circumstances it may not be necessary with other types of transducers, such as magnetic transducers, to provide such a mechanically isolated coupling as shown.

Accordingly, contacts 88, 89 are arranged at their lower ends to engage two different and electrically isolated portions of the circuitry.

With reference to FIG. 9A an insulation strip 91 is interposed between the two contacts 88, 89. Contact 88 terminates in a deformed lower end so as to apply a modest amount of spring pressure to the central conductive shaft 92. The lower end of contact 89 includes a bifurcated end adapted to embrace the sides of an insulation layer 93 and is bent slightly so as to press moderately upwardly against the bottom end of the conductive tubing 94.

Means for taking off the electric signals transduced by stulus 49 include a pair of contacts at the upper end of the assembly shown in FIG. 9 comparable to that shown in FIG. 9A but inverted.

In operation, the open or unobstructed observation region formed by windows 19, 21 and the unobstructed portion of body 37 (which is of transparent material) are disposed in alignment so as to define an indicia area on a portion of the sheet or page adjacent the record 12 to be played back.

Thus, the housing includes a portion serving to isolate on the page in human observable form at least a portion of the information which is to be played back from the record. Use of the scribe mark 22 to align with the scribe mark 23 serves to further more closely dispose stylus element 49 with respect to the record to be transduced.

However, in order to insure essentially precise registration of transducer element 49 with the start of the record path to be transduced, downwardly depending guide tips 26 of M spring 79 are brought into engagement with registration portions 17 disposed adjacent record 12.

The foregoing method of aligning or registering a transducer with respect to a record path accommodates substantial error in the lateral alignment otherwise attempted. For example, by virtue of the fact that registration portions 17 are substantially concentric to and equally disposed on opposite sides of a centerline drawn as a diameter through record 12, it will be readily evident that the guide tips 26 need not be located exactly as shown in FIG. 11 but can be rotated clockwise or counterclockwise any amount so long as they strike the registration portions 17. By bringing both guide tips into contact with an associated one of the registration portions, it will essentially automatically locate stylus element 49 with regard to record 12 in a position for playing, notwithstanding the fact that the unit 11 may be laterally displaced from the center of record 12 as unit 11 approaches record 12.

While FIGS. 11 and 11A show an embossed arrangement for providing raised registration portions 17, it is within the scope of the present invention to provide openings as shown in FIGS. 12 and 12A into which guide tips 26 can drop and be engaged.

Having in mind the foregoing construction and operation of unit 11, functioning by itself in conjunction with individual records 12, another embodiment of the invention includes the system shown in FIG. 14 located, for example, at a student 96 for teaching information to students comprising a playback machine such as the unit 11 including a medium such as the grooved records 12 containing the information to be taught but in recorded form. The system further includes a recording machine such as a tape recorder 97 including a medium upon which the information can be recorded.

The system embodiment shown in FIG. 14 incorporates a number of the components and elements of the unit 11 but shown in FIG. 14 as though removed from unit 11 for purposes of illustration. Thus, bottom plate 24 of unit 11 is shown displaced from unit 11 as is speaker 66 and stylus 49 as well as motor 62.

Recording machine 97 includes a microphone 95 disposed at student station 96 for successively transducing the correctly pronounced audible sounds from playback unit 11 and student 98 so as to record the sounds of both student and unit 11 in succession on the medium of tape recorder 97 whereby, upon playback, the successive statements made by unit 11 can be directly compared to those recorded by student 98.

While the foregoing invention has been described primarily with respect to a teaching environment where the pronouncing of words such as in foreign languages is taught, it is to be understood that the apparatus disclosed herein is readily adaptable and equally usable in other applications such as, for example, the transponding of pre-recorded information applied to packaging or boxes whereby, for example, the price of an item can be readily determined. Further, usage of a device of the kind described is also envisaged for data transducing as a possibility.

The system shown in FIG. 14 contemplates utilization of an external recording machine such as tape recorder 97 which can be turned on and off for purposes of keeping the power supply thereof ready by means of the switch 99. The two armatures 101, 102 are moved between advanced and retracted positions by means of the upward movement of bottom plate 24 which carries actuator 71 upwardly against the pressure of spring 82 so as to make contact with the points 103, 104, respectively.

In this condition, power supply 106 is coupled via switch arm 102 and line 107 to drive motor 62 either in a high or low speed mode of operation depending upon the positioning of a switch 60. While other speed controls can be used, it is to be observed that in one condition of switch 60, a resistor 110 provides for the dissipation of sufficient power to drive motor 62 at low speed.

In addition to driving motor 62 for rotating body 37 and hence stylus 49, lead 107 also supplies power to an amplifier 109 whereby signals received from stylus 49 via lead 86/87 can be amplified and broadcast on loudspeaker 66.

In this circumstance, the broadcast from unit 11 plays back directly to microphone 95. At the same time, switch armature 101 is moved to contact point 103 so as to provide power along lead 108 to that stage of recorder 97 serving to place recorder 97 into active recording operation whereby the audio information broadcast on speaker 66 and transmitted via microphone 95 is picked up through lead 113 and recorded in recorder 97.

A simple on/off switch 99 serves to keep recorder 97 energized or preconditioned for active operation as desired.

A system of the foregoing type permits great flexibility to an instructor who, upon listening to the recorder 97, can readily detect the broadcast information and then compare this information with the information spoken by the student without requiring the student to recite before an entire classroom of his associates. Accordingly, it is only important to record successively the same information on a record medium (as provided by recorder 97) via the microphone 95 so as to provide a successive representation as to the student's performance as compared to the desired performance provided by the pre-recorded broadcast.

Finally, according to another embodiment as shown in FIG. 13, the human observalbe information is "observed" by the fingers 116, 117 of a blind student observing Braille information 118 through his sense of touch. Thus, the Braille information is isolated by finger openings 121, 122 formed through a flange 119 carried by housing 18 whereby after detecting the Braille information, the student can depress unit 11' and obtain an audio playback of the record so as to identify the Braille information associated with the records.

The Braille information 118 is, as noted, disposed adjacent an audio reproducible record 12 whereby the student's fingers essentially feel (and thereby "observe") information during playback of the same information from unit 11'.

While only one finger opening 121, 122 could be used, a pair of opening 121, 122 has been shown in FIG. 13 so as to readily assist the Braille student in aligning unit 11' with the line of Braille printing. However, it is to be understood that Braille information can be derived through a single opening 121 or 122.

Throughout the foregoing explanation, Applicant has referred to the fact that information is recorded in an indicia area in an observable form such as the word dog as it appears in FIG. 2 and that the same information is recorded on the record 12. However, it is to be understood that a typical utilization of this invention contemplates inclusion of additional information on the pre-recorded record 12 so that the word dog can typically be used in a more involved context.

Finally, it will be readily evident that the system as shown and described above with FIG. 14 carries out a relatively effective method of teaching proper pronunciation of words comprising the steps of playing through a speaker pre-recorded words properly spoken, disposing a microphone in the presence of the loudspeaker, recording the words played back onto a record medium via the microphone, and recording onto the medium via the microphone the same words spoken by a student so as to record the student's spoken word and the properly played back word in successive portions of the record medium.

From the foregoing, it will be readily evident that there has been provided an improved hand-held audio transducing device, system and method particularly useful in teaching correct pronunciation of words. It will also be noted that the hand-held device is particularly adapted to register a small rotating transducer with a very small record so that many records can be placed on a page. Finally, by making it possible to achieve relatively precise registration without great difficulty, the transducer device of the kind disclosed becomes a useful tool in conjunction with transducing records wherever they may be located such as on the packaging of boxes and the like for data processing control and similar applications.

We claim:

1. In a hand-held audio transducing device for transducing signals relative to a stationary record carried on a sheet of material, which sheet has observable information adjacent said record related to information playback in said record, a housing small enough to be held in one hand, a playback assembly within said housing including a rotatable body, means for rotating said body, a transducer carried by said body during rotation of said body for following a path of said record, means forming a substantially unobstructed observation portion through said housing allowing observation of said information contained in and to be reproduced from said record, means carried by said rotatable body, registration means and movable into and out of engagement with new sheet for registering said transducer to permit the transducer to follow the record path, and means serving to retract said registration means clear of said sheet and to commence rotation of said body and transducer so as to transduce said information of said record for reproduction to the operator while indicating said information in said observation portion to be observed by the operator during reproduction of said information.

2. In a hand-held audio device according to claim 1 wherein said observation portion includes a passage serving to accommodate entry therethrough of a person's finger to pass into contact with Braille characters formed on said sheet of material to observe said information by touch.

3. In a hand-held transducing device according to claim 1 wherein said body is formed and constructed to provide a substantially unobstructed observation portion, and including means serving to arrest said registration means at a predetermined position relative to said housing upon completion of rotation of said body to align said first and last named portions and said registration means so as to permit said observable information to be observed therethrough.

4. In a hand-held audio player device adapted to play back information from circular records disposed upon a page where information to be played back is disposed adjacent thereto for recognition by one of the human senses, arcuate registration portions disposed on the page and displaced substantially equally in opposite directions laterally from a midline on the page through the center and opposite sides of the record, said device including a housing adapted to be held in the hand of a student, said housing including a portion serving to isolate on said page in tactile or visually observable form at least a portion of said information to be played back, a rotatable transducer assembly for playing back said record containing said information, said assembly comprising a body carried for rotation within said housing, said body including an opening therethrough, a transducer of a type for following a record path of said record, said assembly being pivotally disposed within said opening and said transducer being free to move from one side of said opening to the other during rotation of said body so as to follow the path of said record, means for rotating said body, registration means movable between advanced and retracted positions carried by said body for engaging, while in said advanced position, said arcuate registration portion so as to register said transducer assembly with respect to said record path, and means for conjointly retracting said registration means and rotating said body.

5. In a hand-held audio transducing device for transducing information signals relative to a stationary record carried on a sheet of material, a housing small enough to be held in one hand, playback assembly within said housing including a rotatable body, a transducer carried by said body during rotation of said body for following a path of said record, means carried by said housing and serving to isolate therethrough an observable area on a portion of said sheet adjacent said record said area being adapted to inculde information related to the information to be tranduced relative to said record, means movable between advanced and retracted positions relative to said body and substantially normal thereto carried by said rotatable housing to position for said transducer to permit it to follow the record path, and means for rotating said body and transducers to play back the information of said path while contemporaneously designating said portion of the information via the first named means to be observed by the operator during playback of said information.

6. In a hand-held audio device according to claim 5 wherein said the first named means includes passage serving to accommodate entry therethrough of a person's finger to pass into contact with Braille characters formed on said sheet of material to observe said information by touch.

7. In a hand-held transducing device for transducing information signals relative to a stationary record carried on a sheet of material and including said information, a housing small enough to be readily held in one hand, a transducing assembly within said housing including a rotatable body, a transducer carried by said body during rotation of said body for following a path of said record, means movable between projected and retracted positions carried by said rotatable body for registering said transducer in operative position to follow the record path, and means for rotating said body and transducer to cause transducer to follow the record path to transduce the information of said path.

8. Transducing apparatus use with a medium having a support surface and a sound record disposed thereon, said surface including registration means associated with said record, said apparatus comprising a body small enough to be held in one hand and large enough to overlay said record and associated registration means, said body having upper and lower sides, the lower side having portions for engaging the support surface with the body overlying the record and registration means, means carried by the body for reproducing information from record, said means including a transducer and a transport means for carrying the transducer for movement along the record track, means including a registration element movable relative to said transport means and substantially normal to said support surface and extending downwardly away from the lower side of the transport means said registration element serving to register said transducer with respect to said record in response to sliding said body across said support surface in a single general direction toward said registration means of said surface for engagement therewith, said engagement of said registration means with said registration element serving to accurately dispose said transducer with respect to said record, means carried by the body for energizing the transport means, and means carried by the body and manually operable to initiate operation of said transport means.

9. An audio transducing system including a stationary information carrying record carried on a sheet of material, said sheet of material having Braille characters formed thereon adjacent said record and containing at least a portion of said information carried by said record, an audio transducing device having a housing small enough to be held in one hand, a playback assembly located in said housing, and means carried by said housing including an opening serving to accomodate entry therein of a person's finger to pass into contact with said Braille characters when said playback assembly is in position to playback said record.

* * * * *